United States Patent [19]
Reed

[11] Patent Number: 5,715,473
[45] Date of Patent: Feb. 3, 1998

[54] METHOD AND APPARATUS TO VARY CONTROL POINTS OF AN OUTLINE FONT TO PROVIDE A SET OF VARIATIONS FOR THE OUTLINE FONT

[75] Inventor: Michael R. Reed, Mountain View, Calif.

[73] Assignee: Apple Computer, Inc., Cupertino, Calif.

[21] Appl. No.: 679,943

[22] Filed: Jul. 15, 1996

Related U.S. Application Data

[63] Continuation of Ser. No. 997,897, Dec. 29, 1992, abandoned.

[51] Int. Cl.$^6$ ................................................. G06F 17/21
[52] U.S. Cl. ............................................................. 395/805
[58] Field of Search .................................. 395/150, 151, 395/155; 345/141, 143, 149, 124, 127, 128–131, 23, 26, 116; 382/47, 55

[56] References Cited

U.S. PATENT DOCUMENTS

| | | | |
|---|---|---|---|
| 5,155,805 | 10/1992 | Kaasila | 395/151 |
| 5,159,668 | 10/1992 | Kaasila | 395/151 |
| 5,325,479 | 6/1994 | Kaasila | 395/151 |

FOREIGN PATENT DOCUMENTS

| | | | |
|---|---|---|---|
| 2288010 | 6/1992 | Japan | G09G 5/28 |

OTHER PUBLICATIONS

James D. Foley et al., "Computer Graphics: Principles and Practice," T385. C587, 1990, pp. 12–14.
"WordPerfect for Windows" Reference, Version 5.1, 1991, pp. 157–159.
Adobe Systems Inc., "*Multiple Master Fonts and the Adobe Type Manager(ATM) Software API for the Macintosh*", (four pages).

*Primary Examiner*—Phu K. Nguyen
*Assistant Examiner*—Cliff N. Vo
*Attorney, Agent, or Firm*—Blakely, Sokoloff, Taylor & Zafman

[57] ABSTRACT

A method and apparatus for providing a set of variations of control points of a symbol image, such as a glyph, for display of at least one variation of the symbol image on a display device of a computer controlled display system. The method includes providing a first plurality of control points specifying the outlines of the symbol image; providing variation data for specifying a set of variations for at least one of the control points, the variation data identifying the at least one control point and indicating a spatial manipulation of the at least one control point; modifying the first plurality of control points which specify the outline of the symbol image to spatially manipulate the at least one control point so as to provide a second plurality of control points; scan converting the second plurality of control points to provide a displayable representing of the symbol image; and displaying the displayable representation on the display device. The apparatus includes a storage device to store the first plurality of control points, a storage device to store the variation data and a processor for modifying the first plurality of control points according to the variation data; the apparatus further includes a scan conversion device to convert the second plurality of control points to a displayable representation of the symbol image.

21 Claims, 11 Drawing Sheets

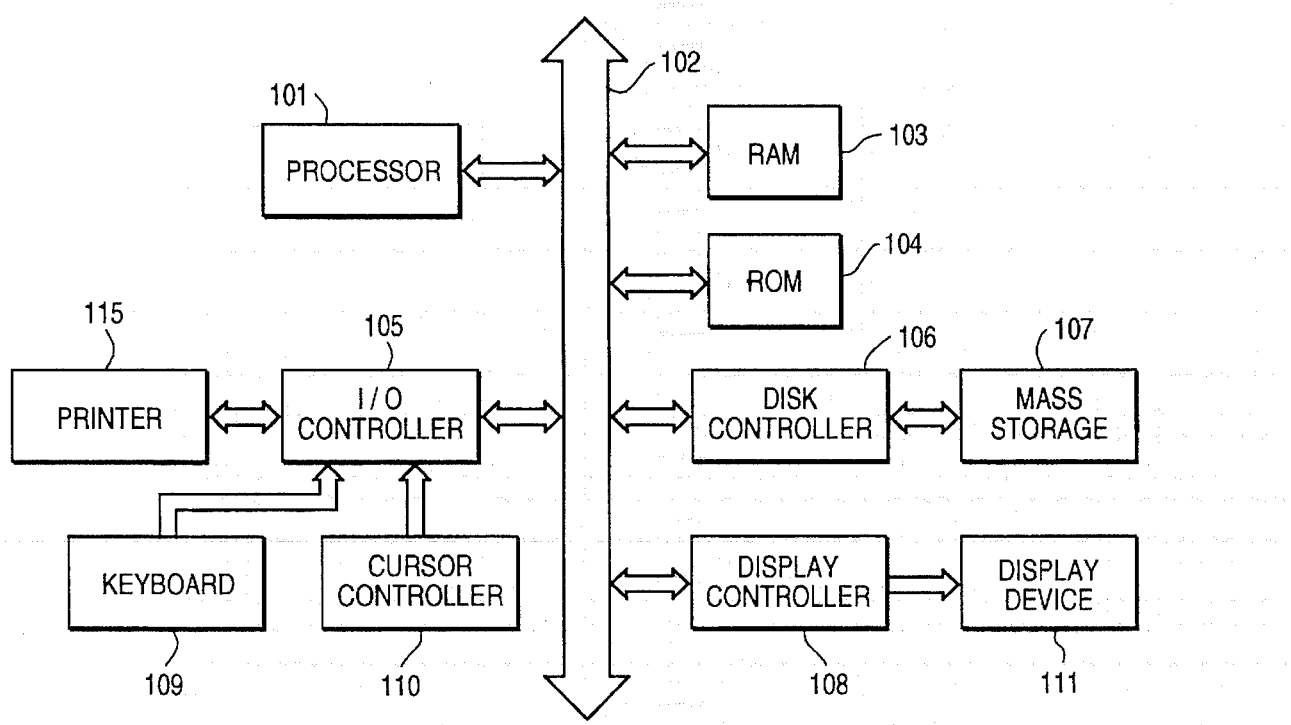
FIG_1
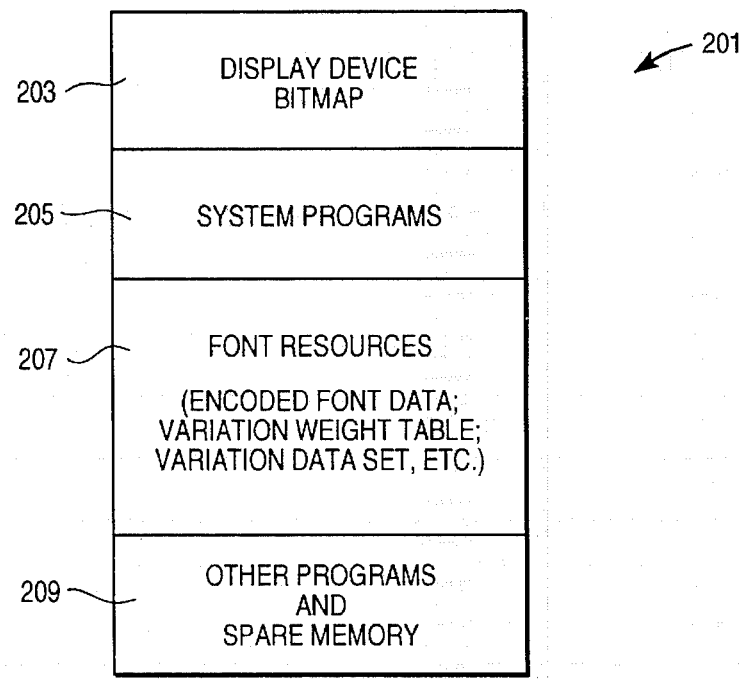
FIG_2

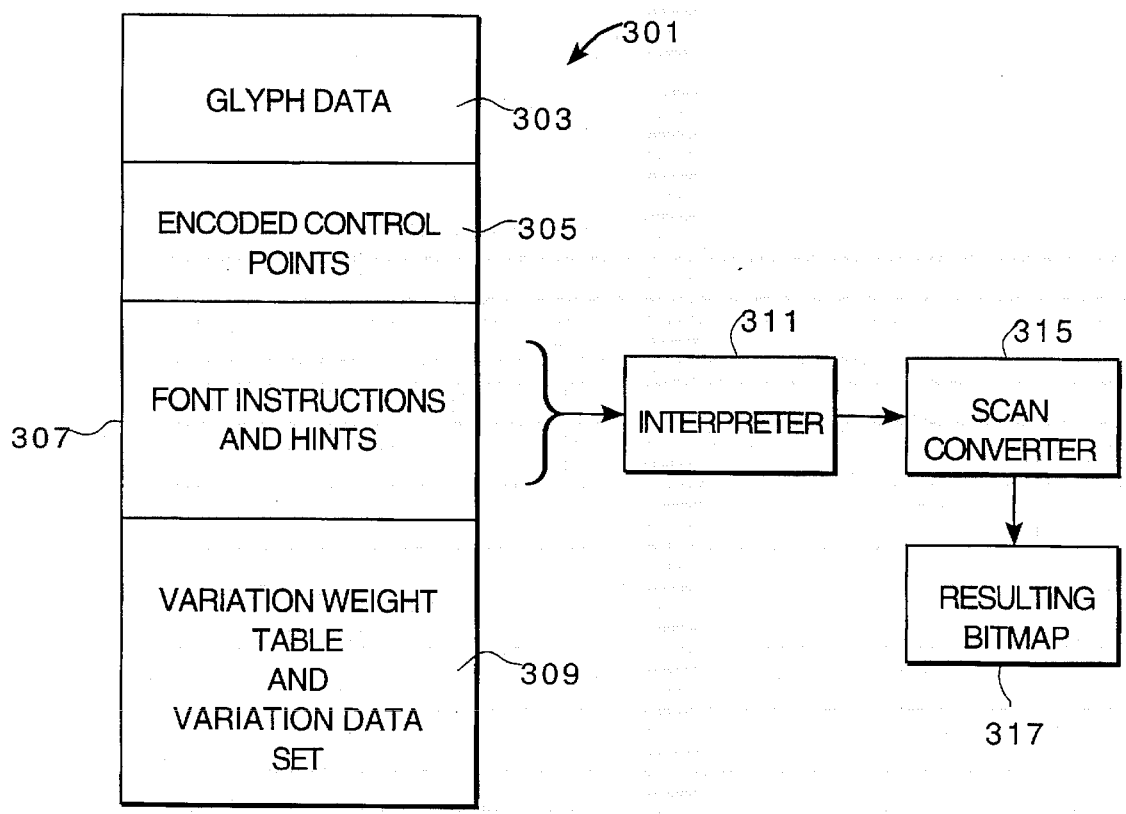
FIG_3
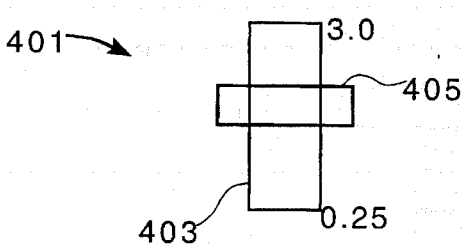
FIG_4

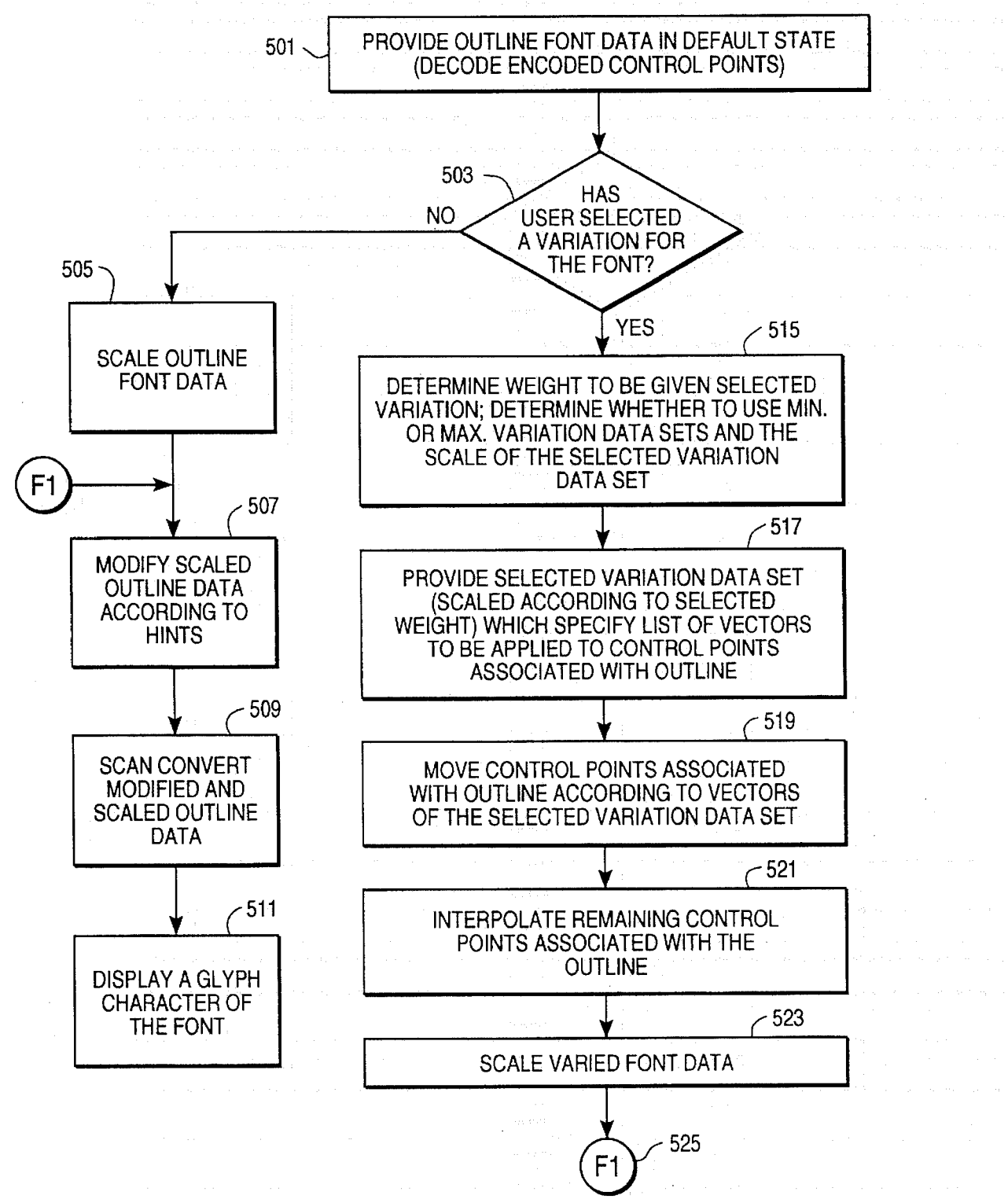
FIG_5

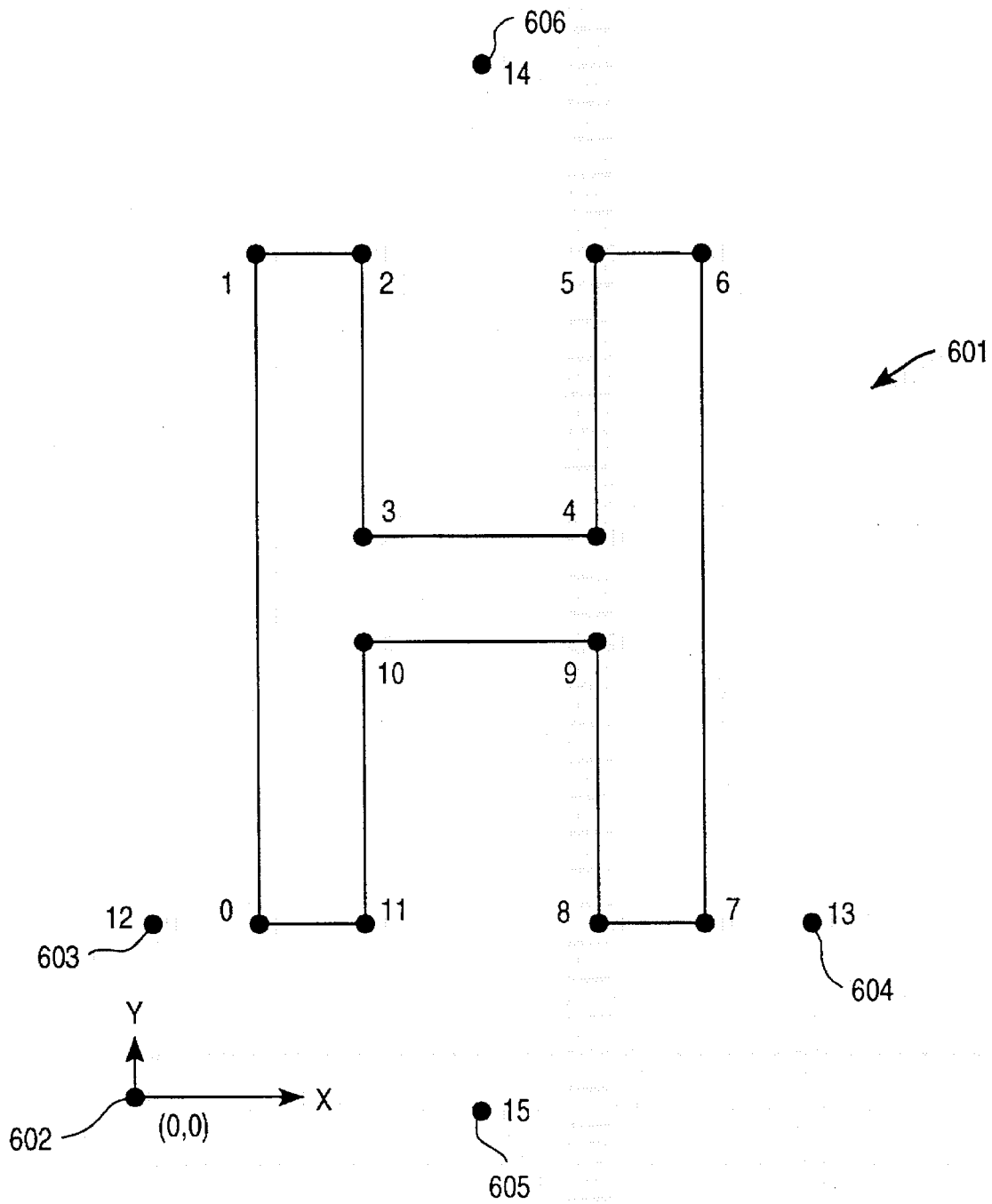
FIG_6

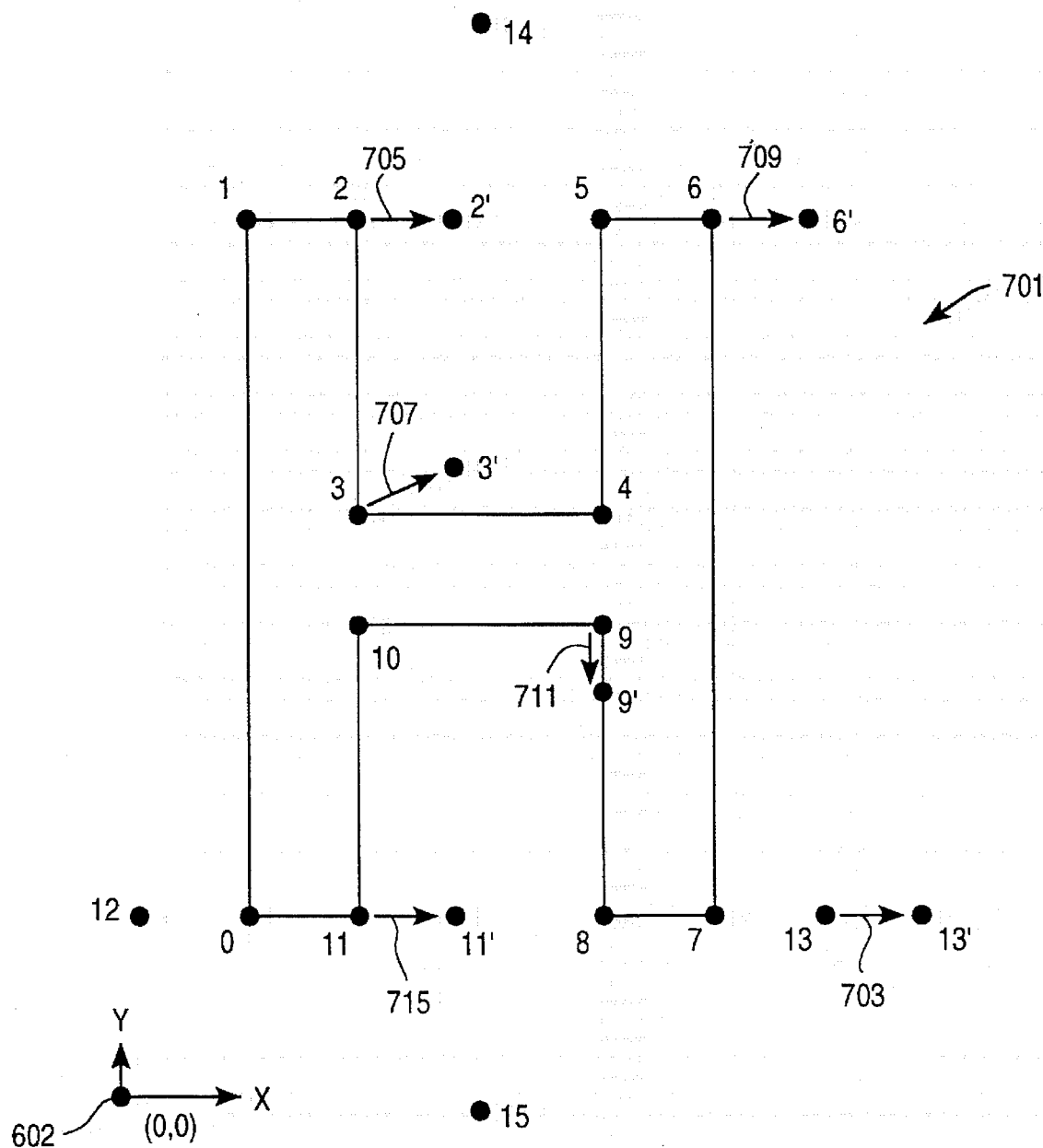
FIG_7A

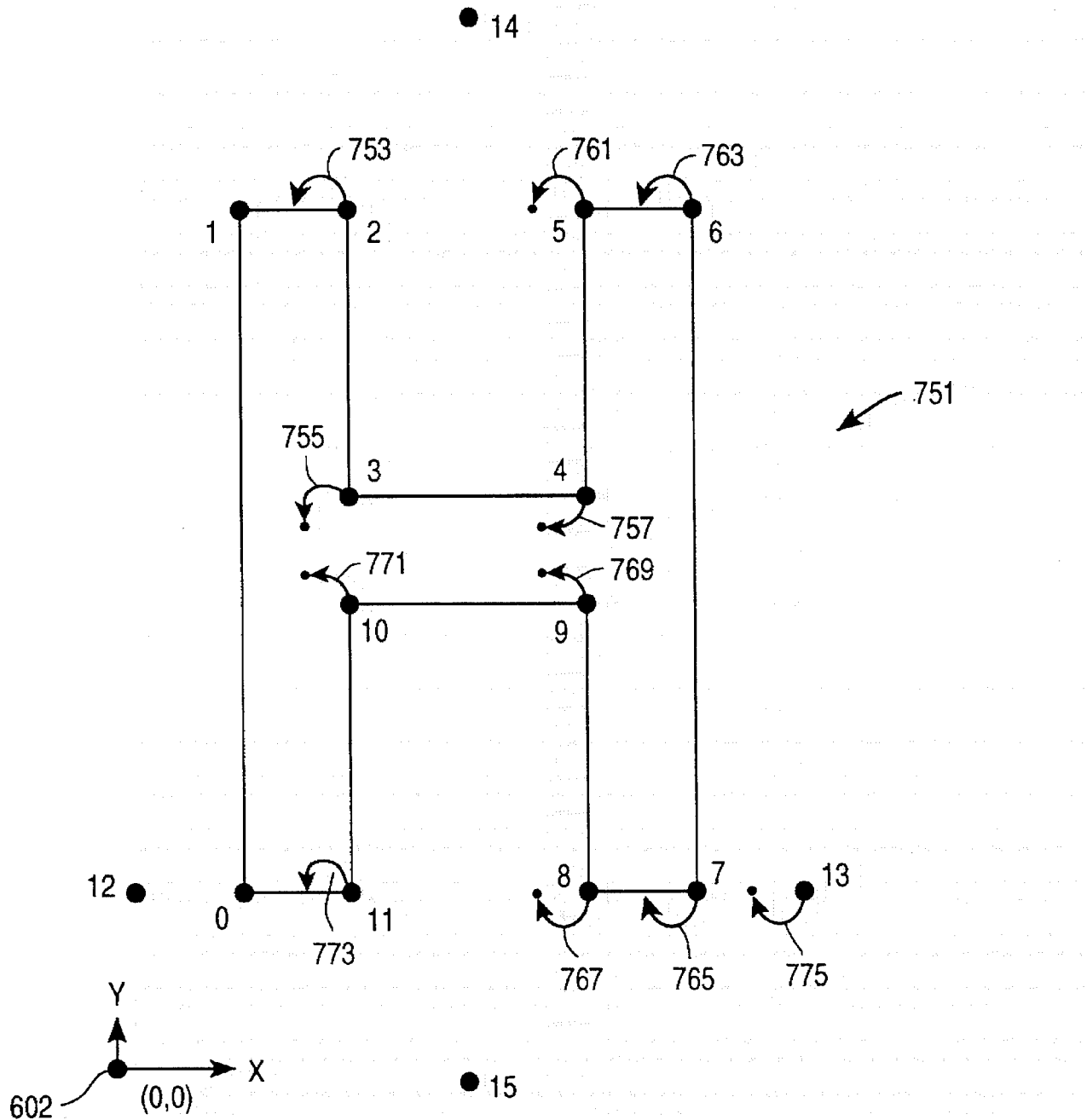
FIG_7B

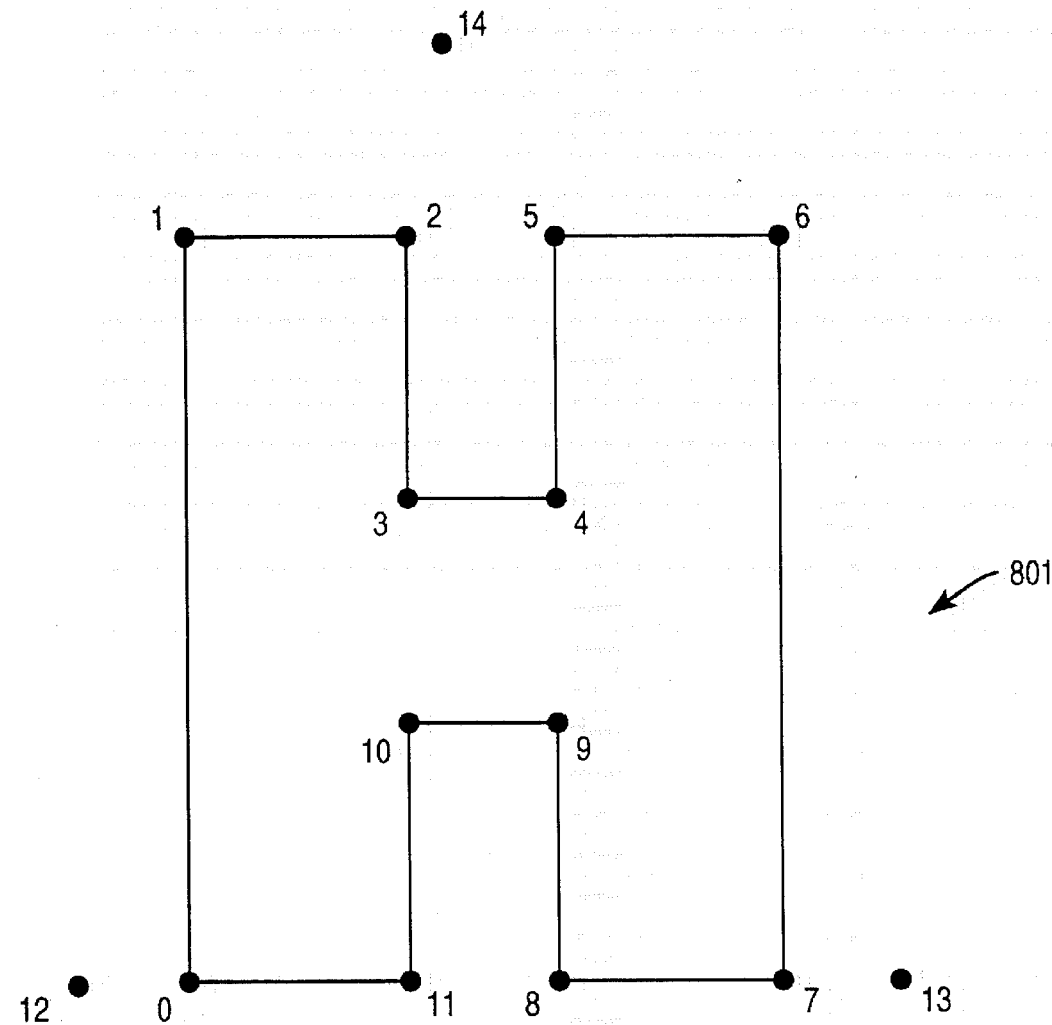
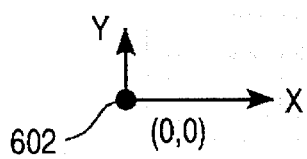

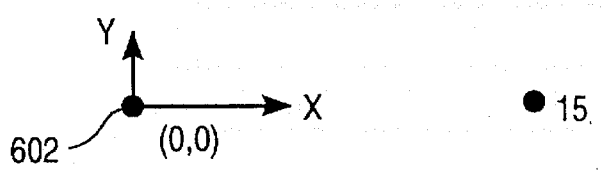

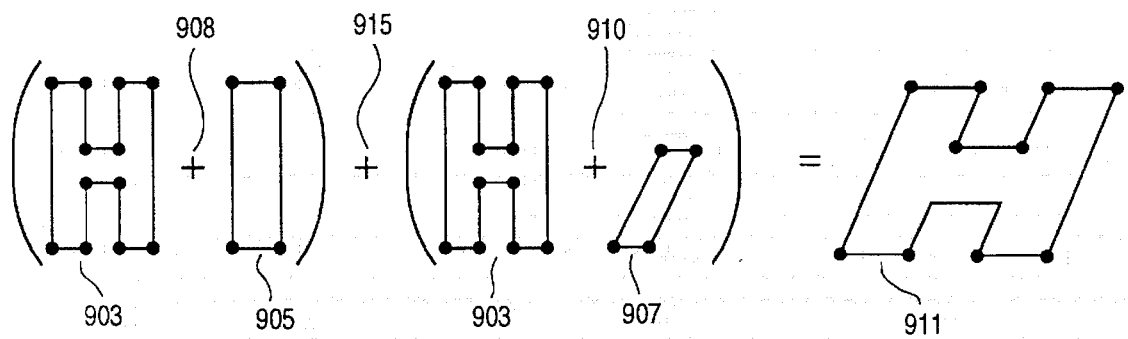
FIG_9
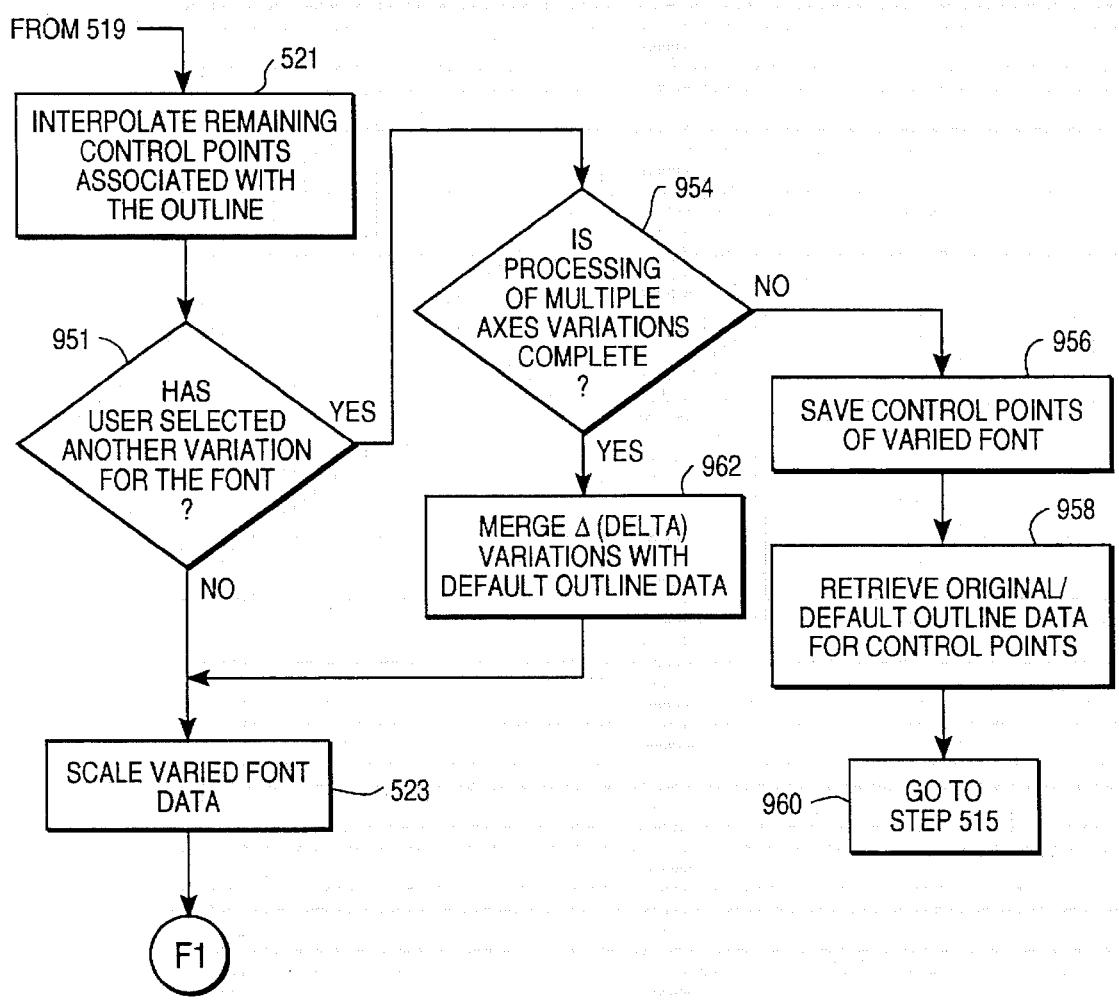
FIG_10

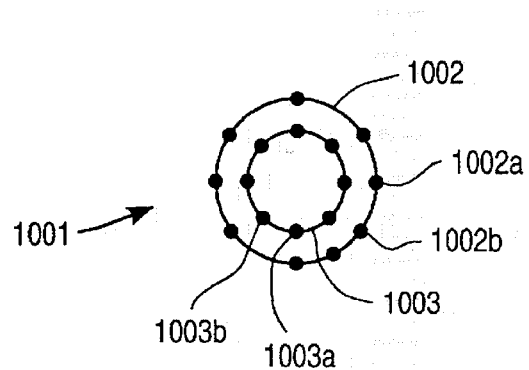
FIG_11A
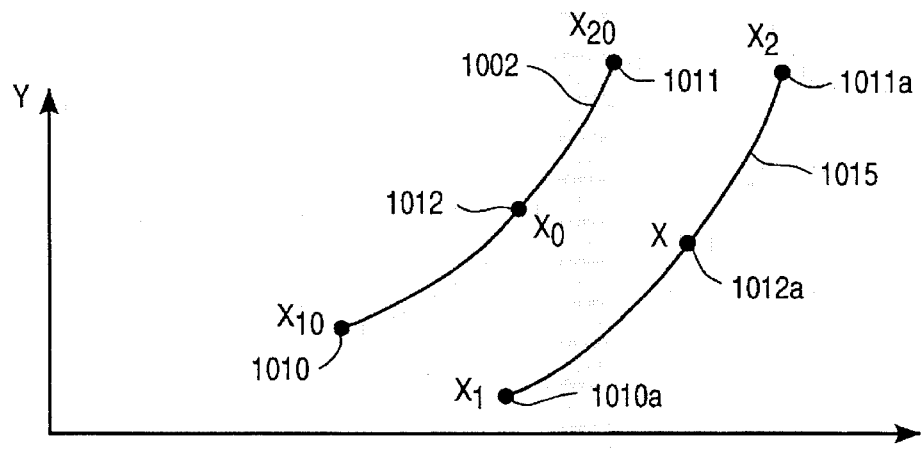
FIG_11B
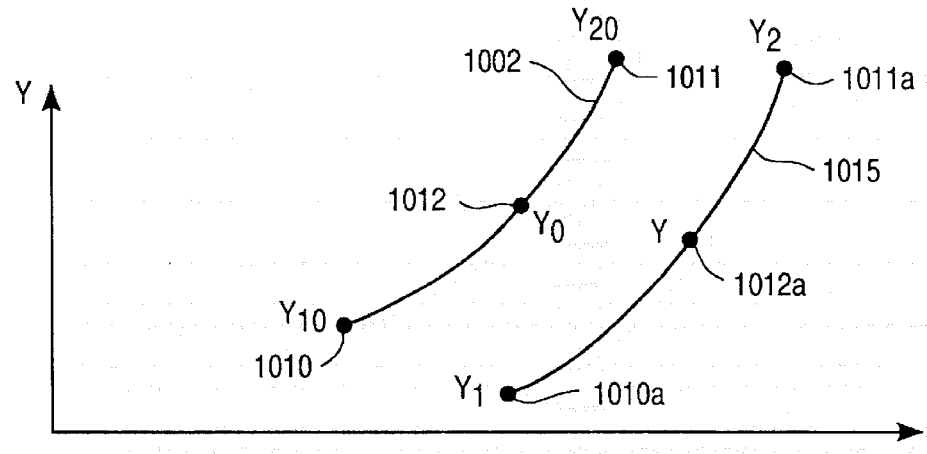
FIG_11C

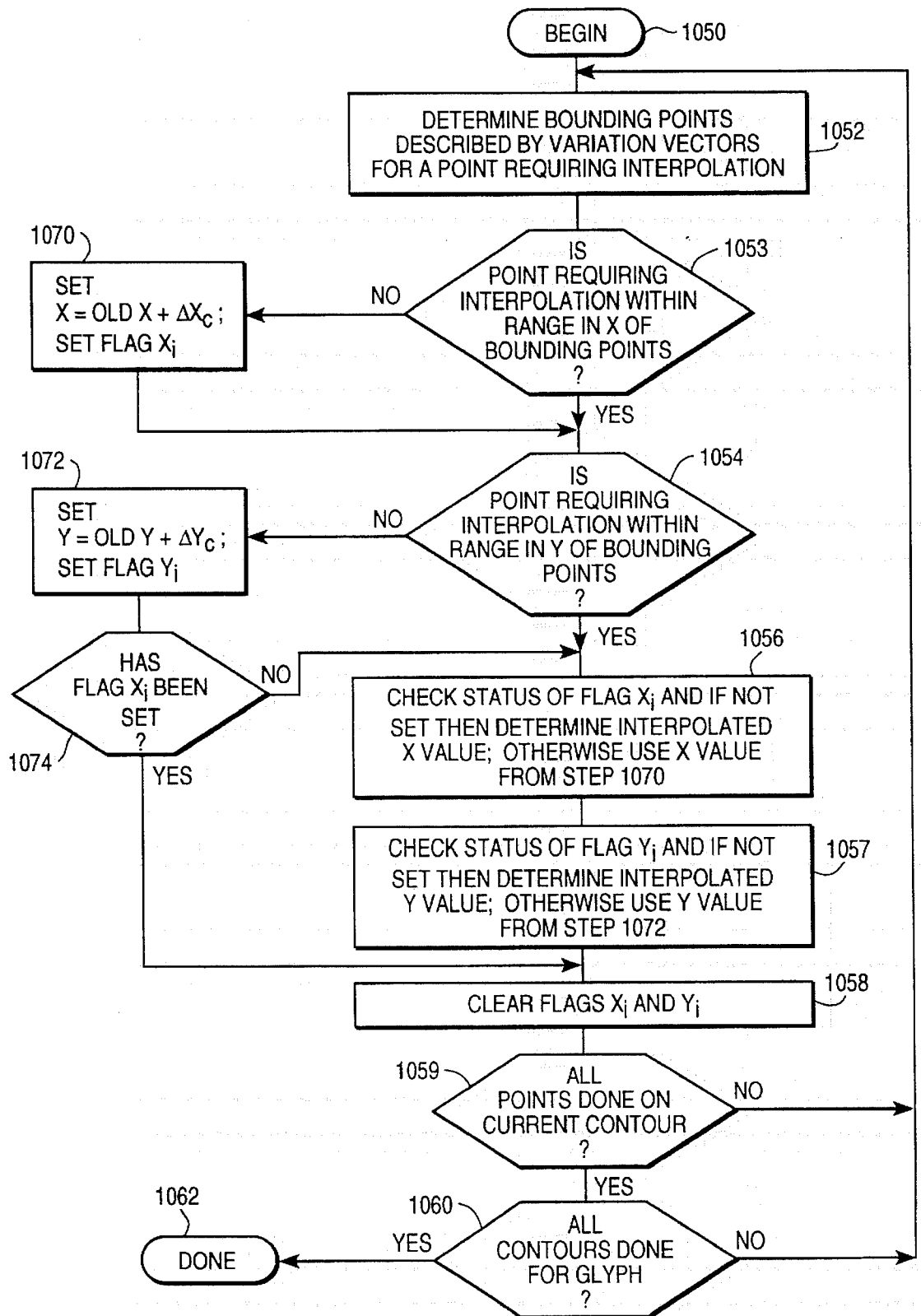
FIG_11D

METHOD AND APPARATUS TO VARY CONTROL POINTS OF AN OUTLINE FONT TO PROVIDE A SET OF VARIATIONS FOR THE OUTLINE FONT This is a continuation of application Ser. No. 07/997,897, filed Dec. 29, 1992, now abandoned.

BACKGROUND OF THE INVENTION

1. Field of the Invention

The present invention relates to the field of digital typography. In particular, the present invention relates to a method for providing a variation of control points which define a symbol image such as glyph for display on a display device typically in a computer controlled display system.

2. Background of Prior Art

Existing digital font-rendering techniques on computers can be classified into three categories (1) bit map type, (2) algorithmic type and (3) outline type.

Bit map rendering techniques are the most direct way to display fonts as ultimately all fonts must be realized as bit maps in the raster output devices such as many printers or display devices used in computer controlled display systems. It will be appreciated that a printer is a form of a display device. In this technique, the glyphs of the fonts are described and manipulated as explicit bit maps. However, such techniques consume a sizable amount of the computer's memory in storing the various different varieties of typefaces and the many different point sizes for each typeface. Thus, while bit map rendering techniques are often still used, other techniques are typically preferred in many circumstances, particularly, when it is desirable to minimize the usage of computer memory. While algorithmic type fonts have been used, they are not widely used because of the popularity of other font rendering techniques.

Outline rendering techniques describe and manipulate typefaces as outlines. The outline representation of a glyph in a font results from the use of splines to record and regenerate the shape of curves which are used to represent the glyph. Splines are curves which are controlled by a small set of given control points, which are often located on the outline or otherwise associated with the outline as in the case of tangent points. Many manufacturers of outline fonts in the world use a system based on the principles of IKARUS. See Peter Karow, *Digital Formats for Typefaces*, (URW Verlag, 1987). Outline-rendering techniques create outlines from digitized input of typefaces and convert outlines automatically to equivalent bit map forms, by scan converting the outline, for output to display devices such as raster output devices (e.g. computer pointers or other display devices such as cathode ray tubes (CRT) or liquid crystal display devices). Representing symbol images or glyphs by outlines not only obviates large memory storage but also permits interactive editing by the font designer.

Often, the user of a particular font will desire that the font be displayed in some variation such as italics, bold, condensed or other widely known variants of a particular font. In the prior art, these variants of a particular font are typically specified by a separate collection of control points which specify the varied outline of the variant font. Other techniques in the prior art for creating a varied font use graphics techniques to manipulate the scaled font by manipulating the bit map of the font after the outline is scanned converted. The first technique in the prior art requires additional storage to approximately the same extent as the original outline font data which specifies the control points. In the alternative technique of using a graphics technique to manipulate the bit map, the designer of the font is typically unable to control the particular graphics technique which is used by the computer program which implements the graphic technique and thus the font designer is unable to control the final appearance of a variant and consequently the variant font created by a graphics technique on a bit map may not be aesthetically pleasing and may be illegible. Therefore, a need exists for a method and apparatus which provides for a range of variations for the control points which specify the outlines of a symbol image, such as a glyph, which range of variations may be obtained from the same set of control points which specify the outline of the glyph or symbol image.

SUMMARY OF THE INVENTION

The present invention provides methods and apparatuses which are most advantageously used in conjunction with a digital computer having a display device to provide an improved font rendering capability. A font is a collection of glyphs which generally has some elements of consistency in their appearance (e.g. serifs or stroke thickness). A glyph is a graphical depiction which usually represents a character, symbol or other textural object. An outline font is a compact way to represent the glyphs on a computer system by creating outlines of the glyphs from control points associated with the outlines.

The present invention provides a technique to describe a space of stylistic variations based on a base outline font (default outline). Once this space has been defined, the font can be specified anywhere in that space, allowing one font to be used as a family of almost an infinite variety of styles. Common styles that can be created with the present invention include emboldening and lightening, condensing and extending, obliqing, tracking, changes in cap height, x-height, desender height, serif width and height, and optical changes based on point size. The style space for providing a variant of a font is described by a variation axis where each axis defines a specific stylistic change. A particular font can have more than one variation axis (e.g. a bold and italicized font specified by a bold variation and an italic variation).

In one typical embodiment of the method of the present invention, a computer controlled display system provides variation data for specifying a set of variations for a plurality of control points which specify the outlines of a symbol image. The variation data includes a means for identifying at least one of the control points (and typically many of the control points) and further includes a means for specifying the spatial manipulation of the selected control points which are to be modified in order to create a variant symbol image. The method further includes the step of modifying the coordinate locations of the original control points by using the variation data to manipulate spatially the control points in order to provide a second plurality of control points which specify the outline of the variant symbol image. This second plurality of control points is then converted, typically by a scan conversion process which is conventional, to provide a displayable representation, such as a bit map, of the variant symbol image. After converting to the displayable representation, the symbol image is displayed on a display device of a computer controlled display system.

In one particular embodiment of the present invention, the method includes storing a first plurality of control points which specify the outlines of a glyph, where the first plurality of control points represent a default image of the glyph. A value is selected in a variant range which represents a range of glyph variations which are provided by the method of the invention in a computer controlled display system. A first variation data set is stored for specifying a set of variations for at least one of the control points, and typically many of the control points; the first variation data set includes a means for identifying at least some of the control points which will be manipulated by use of the variation data and also includes means for specifying a spatial manipulation for the control points which will be manipulated. Typically, the means for identifying is a pointer or a tag identifying a particular control point of the glyph, and the means for specifying a spatial manipulation will comprise a representation of a vector having a magnitude and a direction in some form. Further, the method includes the step of determining a modified first variation set wherein the first variation data set is modified according to the value which was selected in the variant range. Then, the first plurality of control points is modified by using the modified first variation data set to manipulate spatially the control points which have been identified for modification in the first variation data set. Then, the remaining control points of the glyph are modified by linear interpolation based on the old and new positions of the surrounding identified points on a per contour basis. Typically, in this embodiment of the method, the resulting control points which have been modified by using the modified first variation set provides a second plurality of control points which is then scaled according to a selected size for the glyph to provide a third plurality of control points which represent the scaled glyph. At this point, the method utilizes conventional scan conversion techniques for scan converting the third plurality of control points to provide a displayable bit map representation of the glyph which is stored in a memory device, such as RAM of the computer controlled display system. The displayable bit map representation of the glyph is displayed on a display device of the computer controlled display system. It will be appreciated that the user may select other variations for display of the glyph using these variations by repeating the method of the present invention. It will also be appreciated that several different variations each with their own range in a different variation axis may be applied to the same font in order to obtain a multiple variation font (see, for example, FIG. 9).

The apparatus of the present invention is typically a computer controlled display system for rendering fonts from outline font data. The computer controlled display system of the present invention provides a plurality of variations for the control points of a glyph for display of at least one variation of the glyph. The apparatus includes means for storing a first plurality of control points which specify the outlines of the glyph; this means for storing may be mass storage or RAM or some other well known, conventional storage device which may be utilized with font rendering engines or computer controlled display systems. The apparatus further includes means for storing the variation data for specifying a set of variations for at least one of the control points of the glyph. This variation data includes a means for identifying the control points which are to be varied according to the variation data and further includes a means for specifying the manipulation spatially of the control points which are to be varied. Typically, the means for storing the variation data may be any one of the storage devices described above, such as mass storage or RAM or other storage devices utilized in computer systems and/or font rendering digital systems. The apparatus of the present invention also includes means for modifying the first plurality of control points, where this means for modifying is coupled to the means for storing the first plurality of control points and is coupled to the means for storing the variation data. Typically, the means for modifying is a processor, such as a microprocessor, which is often under program control. The means for modifying uses the variation data to manipulate spatially the control points which have been identified by the variation data for manipulation to thereby provide a second plurality of control points. The apparatus of the present invention further includes a scan conversion device, such as conventional scan conversion systems implemented using a program controlled processor which has been programmed for scan conversion using conventional techniques. This scan conversion device scan converts the second plurality of control points to provide a displayable representation, such as a bit map, of the glyph. The scan conversion device is coupled to receive the second plurality of control points typically by being coupled to either the means for modifying or some means for storing in order to receive the second plurality of control points. The apparatus further includes a means for storing the displayable representation of the glyph, which means for storing is coupled to the scan conversion device to receive the bit map. This means for storing is often a frame buffer or may be some other memory device. The apparatus further includes a means for displaying the displayable representation of the glyph, which means for displaying is typically coupled to the means for storing the displayable representation of the glyph. In computer controlled display systems, this means for displaying is often a cathode ray tube (CRT) or a printer or a liquid crystal display device, and this means for displaying typically (but not necessarily) utilizes some raster scan output mechanism as in the case of a conventional CRT.

BRIEF DESCRIPTION OF THE DRAWINGS

FIG. 1 illustrates a typical computer controlled display system which may be used with the present invention.

FIG. 2 shows a typical arrangement of program storage in the system of FIG. 1.

FIG. 3 illustrates a flow chart of the process of converting outline font data into digital typeface through an interpreter and then a scan converter to produce a resulting bit map.

FIG. 4 shows an example of a means for selecting a value in a range of variations, which means may be displayed on a display device of the computer controlled display system.

FIG. 5 shows a flow chart depicting a method of the present invention.

FIG. 6 illustrates a glyph (the "H" glyph) with its associated control points.

FIG. 7A shows a glyph with its associated control points some of which are shown with vectors illustrating a spatial manipulation to obtain a variation of the font.

FIG. 7B illustrates a glyph and its associated control points with vectors illustrating a spatial manipulation to produce a variation of the font.

FIG. 8A illustrates a glyph resulting from a spatial manipulation of the control points of the glyph in order to obtain a particular variation.

FIG. 8B illustrates a glyph showing the result of the spatial manipulation of control points in order to obtain a variation of the font.

FIG. 9 illustrates the use of multiple variation data in order to provide a multiple axis variation of a particular font.

FIG. 10 illustrates a modified method of the present invention used where multiple axis variations are performed on a font.

FIG. 11A illustrates the two contours of an "O" glyph.

FIG. 11B illustrates a portion of a contour with an intervening point between boundary points, which intervening point requires interpolation in X.

FIG. 11C illustrates a portion of a contour with an intervening point between boundary points, which intervening point requires interpolation in Y.

FIG. 11D shows a flow chart illustrating the process of interpolating final X and Y values for intervening points which require interpolation.

DETAILED DESCRIPTION OF THE INVENTION

The detailed description which follows is presented largely in terms of flowcharts and symbolic representations of operations on data and data structures often within a computer memory. These flowcharts and representations are the means used by those skilled in the art of data processing to most effectively convey the substance of their work to others skilled in the art. The methods described here are those requiring physical manipulation of physical quantities such as data bits stored in the form of electrical or magnetic signals. The manipulations performed on the data are often referred to in terms such as multiplying or adding or linearly interpolating, which may be associated with mental operations performed by a human operator. No such capability of a human operator is necessary or desirable in most cases, in any of the operations described herein which form part of the present invention; the operations described herein are machine operations. Useful machines for performing the operations of the present invention include general purpose digital computers or similar devices. The present invention relates to method steps for operating a computer controlled display system and processing electrical or other physical signals to generate other desired physical signals such as pixels which are off or on a display device, typically depending on signals stored in bit map form in a memory. The present invention also relates to apparatus for performing these operations. This apparatus may be specially constructed for the required purposes or it may comprise a general purpose computer as selectively activated or reconfigured by a computer program stored in the computer.

In the following description, numerous specific details are set forth such as algorithmic steps, specific coordinate locations, specific variation data, etc. in order to provide a thorough understanding of the present invention. However it will be obvious to one skilled in the art that the present invention may be practiced without these specific details. In other instances, well known circuits, processing techniques and structures are not described in detail in order not to obscure unnecessarily the present invention.

FIG. 1 shows a typical computer based system having a computer controlled display device for generating computer graphic images according to the present invention. The computer system includes a processor 101 which is often a microprocessor such as the commercially available 68030 microprocessor from Motorola as well as a system bus 102 and RAM 103 and ROM 104 for storage of instructions and data for use by the processor 101. System bus 102 typically includes address and data lines as well as control lines for allowing communication of data and instructions between the various components of the computer system such as the processor 101 and the RAM 103 as well as the other components shown in FIG. 1. A mass storage device 107, such as a hard disk, is coupled to the computer system via a disk controller 106 which is typically coupled to the system bus 102. This system further includes a display device 111 which is coupled to the system through a display controller 108 which is typically coupled to the system bus 102 as shown in FIG. 1. Input and output is also provided by an input/output controller 105 which may be one unit or several different units as is known in the art for controlling the input and output from/to printers 115, keyboard 109, and cursor control devices such as cursor controller 110. Typically, the processor 101 will retrieve programs containing instructions and data from the mass storage device 107 and cause these instructions and data to be loaded into RAM 103 for execution of the instructions. The processor 101 executes the instructions and typically causes a displayable representation, such as a bit map to be created in the RAM 103, which representation is then conveyed typically over system bus 102 to the display controller 108 so that the displayable representation, such as a bit map, may then be displayed on a display device 111 or printer 115. As is well known, the display device 111 may be any variety of suitable computer controlled display devices, such as CRT displays or liquid crystal displays, etc. As is well known, printer 115 may be one or more of any variety of "hard copy" display devices such as laser printers, inkjet printers, etc. It is well known that numerous other computer architectures exist, and the present invention may be practiced in those architectures as well.

FIG. 2 shows a typical arrangement of the major programs contained within the memory 103 illustrated in FIG. 1. In particular, there is shown a display device bit map 203 in the memory 201. This bit map 203 represents the frame buffer memory for the display device 111. Each bit in the bit map corresponds to a particular pixel on a display device in the well known conventional manner for creating bit maps. As is known, the bit map can be described as a two dimensional array of points having known coordinates which map to the display device 111 or the printer 115. As is well known the appearance of a pixel on a display device is controlled by the signals applied to that pixel which signals are derived from data signals stored for that pixel in the bit map memory.

The memory 103 will typically also include system programs 205 which represent a variety of sequences of instructions for execution by the CPU or processor 101 in order to support system level input and output and control. For example, the system programs such as disk operating systems and the like may be stored within this memory 205. Typically also, the programs which provide scan conversion such as the scan converter 315 of FIG. 3 and programs which provide the interpreter functions for the outline font techniques described herein (including the scaling functions) may also be stored in the memory 205. These interpreter programs are shown in FIG. 3 as interpreter 311. The memory within RAM 103 typically also includes font resources shown within the memory region 207, which font resources include conventional outline font data such as encoded font data and the present invention's variation weight table and the invention's variation data set which are described below for use with the invention. Additionally, space within the RAM 103 is typically also reserved for other programs and spare memory and is shown as memory 209 in FIG. 2. These other programs may include a variety of useful computational or utility programs as may be desired.

It will be appreciated that in a typical implementation of the invention, the font resources as well as the system programs will be retrieved from the mass storage device 107 by the processor 101 and then loaded into the RAM 103. That is, the system programs and the font resources will be stored on the mass storage device 107 and retrieved from the device and loaded into the RAM 103 or other memory associated with the computer system. However, as is known in the art, the mass storage device 107 may be used as virtual memory in which case the font resources may remain on the mass storage device 107 or may be located in the ROM 104. It will also be appreciated that numerous examples exist in the prior art for outline font data and interpreter programs as well as scan converter devices/programs for scan converting outline fonts to produce bit maps. An example of such prior art is the outline font technology known as TrueType from the assignee of the present invention. The details of the operation of TrueType outline fonts may be obtained from numerous publications, including U.S. Pat. No. 5,155,805. The preferred embodiment of the present invention operates with TrueType outline fonts to provide variations of these fonts.

FIG. 3 shows an interpreter and scan converter in the context of the present invention. The input to the interpreter consists of the control points that make up a glyph as well as other information such as information describing the beginning and the ending of the outlines and font instructions and hints as well as the variation weight table and the variation data set provided by the present invention. That is, the font resource data 301 shown in FIG. 3 provides input to the interpreter 311, and this data includes conventional glyph data 303 as well as the conventional encoded control points 305 and conventional font instructions and hints 307. In addition, the present invention provides additional data to the interpreter 311 in the form of a variation weight table and variation data set 309 according to the method and apparatus of the present invention. This weight table and the variation data set are processed in the manner described below to provide a variant set of control points to the interpreter for further processing including scaling and hinting by the interpreter and finally scan conversion by the scan converter 315.

The method of the present invention will now be described by referring to FIG. 5 along with figures of the "H" glyph shown in FIGS. 6, 7A, 7B, 8A and 8B. The method begins in step 501 wherein the control points associated with a particular outline font data set are retrieved and decoded (if necessary) in order to provide the default state of control points for the particular glyph and/or glyphs in a font. This is normally done in the conventional manner by the interpreter 311 receiving the encoded control points 305 and then decoding them using known techniques to obtain the control point coordinate values for the control points of the glyph. As will be appreciated by those in the art, the control points are described typically by X, Y coordinate values in a coordinate space which is predetermined. FIG. 6 shows the decoded control points for the "H" glyph in a coordinate system having an X and Y axis with an origin at 602; it will be appreciated that specific details, such as the location of the origin and points 12, 13, 14 and 15 relative to the glyph's location will depend on the particular font and the font designer's needs. The glyph 601 shown in FIG. 6 includes eleven control points which are situated exactly on the outline of the glyph and further includes four sidebearing control points 603, 604, 605 and 606 which are associated with the outline and may be used to describe the character for purposes of horizontal spacing and vertical spacing relative to other characters surrounding the glyph 601 when the glyph is used in normal text. Control points may be on or off the outline; points off an outline are often specifying B spline curves. In either case (on or off) the control points are associated with the outline. These control points for the glyph 601 are also set forth below in Table A, wherein a specific coordinate value has been assigned to each point number; for example, point number 14 (labeled 606 in FIG. 6) has an X coordinate value of 15 and a Y coordinate value of 46. It will be appreciated by those in the art that these coordinate values will depend upon the particular coordinate system used such that, for instance, point number 14 may have X, Y values of 150 and 460 respectively instead of the values shown in Table A.

TABLE A

Decoded Control Points for "H" glyph

| Point No. | X | Y |
| --- | --- | --- |
| 0 | 5 | 8 |
| 1 | 5 | 38 |
| 2 | 10 | 38 |
| 3 | 10 | 25 |
| 4 | 20 | 25 |
| 5 | 20 | 38 |
| 6 | 25 | 38 |
| 7 | 25 | 8 |
| 8 | 20 | 8 |
| 9 | 20 | 20 |
| 10 | 10 | 20 |
| 11 | 10 | 8 |
| 12 | 0 | 8 |
| 13 | 30 | 8 |
| 14 | 15 | 46 |
| 15 | 15 | 0 |

The next step shown in FIG. 5 involves determining whether the user of the system has selected a variation for the particular font, step 503. In effect, if the user has not selected a variation for the font and the method and apparatus of the present invention is not used, then processing proceeds to step 505 in which the interpreter, in the conventional manner, scales the outline font data, and then the interpreter modifies in step 507 the scaled outline data according to the hints and other font instructions provided by the font instructions and hints 307 of FIG. 3. Then, the scan converter, in step 509 scan converts the modified and scaled outline data to produce a resulting bit map 317 which is displayed in step 511 on a display device (e.g. printer 115 or device 111) of the computer system.

If the user has selected a variation for the font then the method and apparatus of the present invention will be used, and processing proceeds from step 503 to step 515. In step 515, the system determines the weight to be given to a selected variation. In a typical embodiment of the present invention, a variation weight table will be provided for each variation which is available in the system. As noted above, a font may be described by any number of variations such that a particular font can have multiple variations applied to it (e.g. bold and italicize variations), and each variation is described by its own variation axis. Each axis defines a specific stylistic change and, in a particular embodiment, it will include a name and a tag as well as a numerical value that describes the base (default) outline in a numerical range of changes from the base value that the font can simulate. For example, a font with one variation axis for weight control could contain the following information in its variation weight table.

TABLE B

Variation Weight Table

| Name | Tag | Minimum | Default | Maximum |
|---|---|---|---|---|
| "Weight" | wght | 0.25 | 1.0 | 3.0 |

This table would be interrupted as follows: this font contains a "weight" variation with a standard tag of "wght". Without any variations applied, the font weight is (by default) 1.0, and the font can simulate any weight between 0.25 and 3.0. It will be appreciated that this table may contain numerous entries, each one for a particular variation axis and containing information similar to that shown in Table B above.

The weight is determined in step 515 for a particular selected variation by examining the weight value provided to the system, typically by the user of the system who has selected a desired weight in order to achieve a desired appearance of the font on the display device. In one embodiment, the computer system may display on the display device 111 a slider such as the weight adjustment slider 401 of FIG. 4, which the user may then use to select a particular weight by moving the bar 405 up and down the vertical region 403. In a particular embodiment, the bar 405 may be controlled by a cursor control device 110, such as a mouse in the well known manner of using a cursor control device in a graphical user interface to provide instructions and commands to a computer system. Thus, in this embodiment depicted generally by FIG. 4, the user would select a particular weight by moving the bar 405 along the region 403 and this weight selected would then be used to scale the variation data set which are typically variation vectors which are described below.

In a typical embodiment of the present invention a variation data set provides a variant glyph by using a list of glyph variations to modify a default outline which includes control points having coordinates. Each glyph variation describes a change to the glyph's outline for a spatial coordinate in the font's style space. In one embodiment the variation data set consists of an identification of typically a plurality of control points as well as a list of vectors which are applied to the identified control points associated with the outline. In the preferred embodiment of the present invention, two variation data sets, a minimum variation data set and a maximum variation data set, are provided for each variation (variation axis). For example, Tables C and E below show a minimum and maximum variation data set for the "weight" variation axis described in Table B. Note that in Table C a series of control points is specified in the far left column, and for each control point there is an X and Y coordinate value which indicates a movement in X and movement in Y for the control point in order to vary the location of the control point to thereby obtain a varied glyph. It will be appreciated that the X, Y data in the variation data set, such as the data sets shown in Tables C and E, are typically stored in the same coordinate space as the decoded control points of the default glyph, such as those control points shown in Table A above. Similarly, the scaled variation data set such as the variation vectors shown in Tables D and F are typically stored in the same coordinate space ("master coordinate space") as the original decoded control points such as those points shown in Table A.

TABLE C

"Bold" (Maximum) Variation Vectors for Weight Variation of "H" glyph (Weight Variation Data Set - Maximum)

| Point | X | Y |
|---|---|---|
| 0 | 0 | 0 |
| 2 | 10 | 0 |
| 3 | 10 | 5 |
| 5 | 0 | 0 |
| 6 | 10 | 0 |
| 8 | 0 | 0 |
| 9 | 0 | −5 |
| 11 | 10 | 0 |
| 13 | 10 | 0 |

TABLE E

"Light" (Minimum) Variation Vectors for Weight Variation of "H" glyph (Weight Variation Data Set - Minimum)

| Point | X | Y |
|---|---|---|
| 0 | 0 | 0 |
| 2 | −3 | 0 |
| 3 | −3 | −2 |
| 4 | −3 | −2 |
| 5 | −3 | 0 |
| 6 | −6 | 0 |
| 8 | −3 | 0 |
| 9 | −3 | +2 |
| 11 | −3 | 0 |
| 13 | −6 | 0 |

It will be appreciated by those in the art that the variation data set may take any number of forms in order to accomplish the goal of varying the control points describing the outlines of glyphs in a font. The examples given here in Tables C and E will now be described in detail for a thorough understanding of the manner of operation of the variation data set. Table C shows the maximum variation data set for the weight variation axis. Assuming that this variation axis is defined by the weight table shown in Table B and further assuming that the control points, as decoded, for the "H" glyph are shown in Table A then Table C specifies for certain selected control points the movement of those control points in X and Y directions for a maximum "bold" variation where the weight is set, using for example the slider of FIG. 4, at the maximum value of 3.0 as shown in Table B. Thus, for example, if the weight is set at 3.0 then control point 2 is moved positive 10 coordinate spaces in X without any change in Y. This represents a lateral movement along the X coordinate. Similarly, for control point 3 if a weight of 3.0 is selected then control point 3 is moved over ten spaces in X and up five spaces in Y. Table E shows the minimum variation vectors for the weight variation of the "H" glyph. Thus, for example, if a weight of 0.25 (the minimum weight) is selected by moving the bar 405 down to the bottom of the region 403, then the vectors in Table E will be used to manipulate spatially the control points designated in Table E. For example, control point 3 will be moved by minus 3 spaces in X and by minus 2 spaces in Y while control point 9 will be moved minus 3 spaces in X and plus 2 spaces in Y.

It will be appreciated that the user of the computer controlled display system may select a particular weight other than the minimum or maximum weights which are specified by these two tables, Tables C and E. Two examples are given below for different weights at 1.8 and 0.5 in order to demonstrate the operation of the present invention at two different weights for the same variation axis while using two different weight variation data sets.

For example, assume the user selected a weight value of 1.8. In a particular embodiment of the present invention, the system determines whether to use the minimum or the maximum variation data set and then scales the selected variation data set according to the weight value selected. In this embodiment, the method of the present invention determines whether the selected weight value is above the default value of 1.0 (given in Table A) and if so then the maximum variation data will be used after it is scaled according to the value of 1.8. Since 1.8 is 40% of the way between 1.0 (the default value) and 3.0 (the maximum value) the maximum variation data set shown in Table C will be scaled by 40% to provide a scaled variation data set such as that shown in Table D. This occurs in step 517 as shown in FIG. 5.

TABLE D

40% of "Bold" Variation Vectors for Weight Variation of "H" glyph

| Point | X | Y |
| --- | --- | --- |
| 0 | 0 | 0 |
| 2 | 4 | 0 |
| 3 | 4 | 2 |
| 5 | 0 | 0 |
| 6 | 4 | 0 |
| 8 | 0 | 0 |
| 9 | 0 | −2 |
| 11 | 4 | 0 |
| 13 | 4 | 0 |

Note that rounding (if necessary or desired) has been assumed to occur in scaling the variation data set of Table C to produce the variation data set at a weight of 1.8 which is shown in Table D. In general according to this embodiment, if the selected weight is above the default value specified in the weight variation Table B, then the scaling factor which will be used to scale by multiplication the X and Y coordinate values in the maximum variation data set will be determined by the following: Scale factor=(X−default)/(maximum−default), where X is the value of the selected weight. FIG. 7A shows the application of the variation data set of Table D to the glyph 701 which is originally described by the control points of Table A. For example, control point 3, originally at X=10, Y=25 will be moved in the manner shown by vector 707 by increasing the X coordinate at 4 spaces and by increasing the Y coordinate by 2 spaces. Similarly, control point 9, which was originally at X, Y=20, 20, will now be moved such that it will have the same X value but the Y value will be decreased by 2 spaces yielding a new coordinate location for control point 9 of X=20, Y=18. This movement is shown by the vector 711 in FIG. 7A. Vectors 703, 705, 709 and 715 represent the spatial manipulation of control points 13, 2, 6 and 11 respectively, according to the variation data set of table D. Again, the coordinate locations of FIG. 7A are given in the same coordinate space as the original decoded control points of Table A and the control points shown in FIG. 6. The movement of control points (spatial manipulation) associated with the outline according to the vectors of the selected and scaled variation data set occurs in step 519 as shown in FIG. 5. It will be appreciated that this movement and/or manipulation may merely be a change in the coordinate's value and does not require an actual movement of a point in a coordinate system (such as moving points on a graph). That is, it is a conceptual movement describing a change in a control point's coordinate values which, conceptually, represents a move.

When the weight value of 0.5 is selected, then the method of the present invention determines that the minimum variation data set shown in Table E will be used and scaled to provide the "light" variation vectors set forth in Table F. That is, according to the method of the present invention, the system determines that the selected weight value of 0.5 is less than the default value of 1.0 and therefore uses the minimum variation data set, scaled according to the proportion represented by the location of the selected weight value relative to the range between the minimum weight value and the default weight value. That is, since the weight value of 0.5 which was selected is 67% of the way between the minimum weight value of 0.25 and the default weight value of 1.0, the minimum variation data set of Table E will be scaled by a factor of 67% (0.67) in order to produce scaled variation vectors shown in Table F. According to this embodiment, in general, if the selected weight value is below the default value then the scaling of the minimum variation data set to the proper scaled variation data set is determined by the following: scale factor=(default−X)/(default−minimum), where X represents the selected weight value. Note that rounding may be applied to the variation vectors which are scaled as shown in Table F. Again, these scaled variation vectors are then applied to the original control points of Table A for the control points specified in Table F in order to obtain spatially manipulated control points such as those shown in FIG. 7B which shows the application of variation vectors 753, 755, 757, 761, 763, 767, 769, 773 and 775 according to Table F applied to the control points 2, 3, 4, 5, 6, 8, 9, 11, and 13, respectively, of Table A in order to obtain new control points for a modified "H" glyph 751. FIG. 7B also shows certain control points (7 and 10), the movement of which is not specified directly by Table F, which have also been moved according to vectors 765 and 771, respectively, by interpolating in the manner described below.

TABLE F

67% of Light Variation Vectors for Weight Variation of "H" Glyph

| Point | X | Y |
| --- | --- | --- |
| 0 | 0 | 0 |
| 2 | −2 | 0 |
| 3 | −2 | −1 (or −⅔) |
| 4 | −2 | −1 (or −⅔) |
| 5 | −2 | 0 |
| 6 | −4 | 0 |
| 8 | −2 | 0 |
| 9 | −2 | +1 (or +⅔) |
| 11 | −2 | 0 |
| 13 | −4 | 0 |

In typographical terms, the maximum variation data set could represent a "bold" version of the "H" glyph and be labeled at the maximum value in Table B for weight variation of the "H" glyph and be considered the maximum value along the weight variation axis. The second set of variation vectors (the minimum variation vectors shown in Table E) could represent a "light" version of the "H" glyph, and be labeled at the minimum axis coordinate value for weight of the variation weight table of Table B and be considered the minimum value along the weight variation axis. When a specific weight value is selected, the invention determines which variation data set to use based on which side of the font's default weight value the selected weight value lies, and then translates that coordinate along the variation axis into a percentage scale factor for the chosen variation vectors.

After the control points identified in the particular variation data set (after scaling of the data set) have been moved by their vector amounts, the remaining points, if any, are linearly interpolated based on the old and new positions of the surrounding identified points on a per contour basis. Table G and FIG. 8A show the resulting control points after interpolation for the "H" glyph at a weight variation of 1.8. Note that this glyph 801 now appears as a bold version of "H". Similarly, after interpolation of the remaining points according to the present invention, the control points appear at coordinates shown in Table H for the "H" glyph at a weight variation of 0.5. FIG. 8B shows the resulting glyph 821 with its control points at a weight variation of 0.5.

TABLE G

Decoded Control Points for "H" glyph at Weight Variation of 1.8

| Point | X | Y |
| --- | --- | --- |
| 0 | 5 | 8 |
| 1 | 5 | 38 |
| 2 | 14 | 38 |
| 3 | 14 | 27 |
| 4 | 20 | 27 |
| 5 | 20 | 38 |
| 6 | 29 | 38 |
| 7 | 29 | 8 |
| 8 | 20 | 8 |
| 9 | 20 | 18 |
| 10 | 14 | 18 |
| 11 | 14 | 8 |
| 12 | 0 | 8 |
| 13 | 34 | 8 |
| 14 | 15 | 46 |
| 15 | 15 | 0 |

TABLE H

Decoded Control Points for "H" glyph at Weight Variation of 0.5

| Point | X | Y |
| --- | --- | --- |
| 0 | 5 | 8 |
| 1 | 5 | 38 |
| 2 | 8 | 38 |
| 3 | 8 | 24 |
| 4 | 18 | 24 |
| 5 | 18 | 38 |
| 6 | 21 | 38 |
| 7 | 21 | 8 |
| 8 | 18 | 8 |
| 9 | 18 | 21 |
| 10 | 8 | 21 |
| 11 | 8 | 8 |
| 12 | 0 | 8 |
| 13 | 26 | 8 |
| 14 | 15 | 46 |
| 15 | 15 | 0 |

As shown in FIG. 5, the interpolation step 521 occurs after moving the control points specified in the selected and scaled variation data set which occurred in step 519. After the interpolation step of 521, the control points are then scaled in step 523 using conventional outline font scaling means; this is similar to the procedure which occurs in step 505. Then processing continues through node 525 into step 507 where the scaled control points are modified in the conventional manner by hints, and then these control points are scanned converted in step 509 and finally the glyph is displayed at step 511.

Interpolation of the remaining control points not specified in the variation data set occurs in the following manner.

Interpolation occurs on a per contour basis, which means that the control points requiring interpolation along a contour are interpolated solely on the basis of other control points along the same contour. As shown in FIG. 11A, a glyph may have more than one contour. FIG. 11A shows the "O" glyph 1001 with a contour 1002 and a second contour 1003. Note that the "H" glyph requires a single contour; see FIG. 6. In the preferred embodiment, the control points are numbered in order along the contour as shown in FIG. 6. In the case of FIG. 11A, control points on the outer contour 1002 are numbered in one direction, and control points on the inner contour 1003 are numbered in an opposite direction. Several control points, such as control points 1002A and 1002B are shown on a contour 1002 of FIG. 11A. Separately, control points 1003A and 1003B are shown along the contour 1003. As noted above, interpolation for control points not specified in the original variation data set along the contour 1003 will be determined by using control points which have been specified in the original variation data set and which are on only contour 1003; control points on contour 1002 do not affect interpolation of points associated with contour 1003.

FIG. 11B illustrates a portion of contour 1002 before the application of the variation data set which is used to modify the contour. Specifically, the portion of the contour 1002 shown in FIG. 11B is that portion which exists between control point 1010 and control point 1011. Assume for purposes of discussion that variation vectors for control points 1010 and 1011 have been specified in the original variation data set such that the values of the coordinates for these control points can then be determined for a varied font in order to provide a modified contour 1015 as shown in FIG. 11B. This modified contour 1015, a portion of which is shown in FIG. 11B, includes control points 1010A and 1011A which have been produced by the process shown in FIG. 5 up to and including the step 519. Thus, the varied font data has been determined for points 1010A and 1011A and interpolation is now required to determine the coordinates for point 1012A as shown in FIG. 11B. Interpolation of the coordinate values is performed separately for X and Y. FIG. 11B shows the process for X value interpolation, and FIG. 11C shows the process for Y value interpolation. It will be appreciated that control points 1010 and 1011 as well as control points 1010A and 1011A will have known coordinate values since these values were either provided in the original font data (default state—for the contour 1002) or were determined according to the method of the invention up to and including step 519 of FIG. 5. The coordinate values for the intervening control point 101 2 will be known as these values are contained in the original font data set, such as that shown in Table A. Thus, all that is required is to determine the coordinate values, separately for X and Y, for the point 1012A, which is the point requiring interpolation. These coordinate values may be determined according to the following equations for X and Y:

$$X = X_1 + \left( \frac{X_0 - X_{10}}{X_{20} - X_{10}} \right)(X_2 - X_1);$$ (formula 1)

$$Y = Y_1 + \left( \frac{Y_0 - Y_{10}}{Y_{20} - Y_{10}} \right)(Y_2 - Y_1).$$ (formula 2)

It will be appreciated that "X" is the value along the X axis of the point 1012A given the known X values of $X_1$, $X_2$, $X_{10}$, $X_0$, and $X_{20}$ for control points 1010A, 1011A, 1010, 1012, and 1011 respectively. Similarly, it can be seen that the Y value of control point 1012A is determined from the known Y values $Y_1$, $Y_2$, $Y_{10}$, $Y_0$, and $Y_{20}$ for control points 1010A, 1011A, 1010, 1012, and 1011 respectively. These equations apply generally for determining interpolated X and Y values. In general, formula 1 specifies the interpolated value along the X axis for a point requiring interpolation given the X values of the bounding points before spatial manipulation by the variation vectors (i.e. $X_{10}$ and $X_{20}$) and given the X values of the bounding points after spatial manipulation by the variation vectors (i.e. $X_1$ and $X_2$) and given the original X value of the point requiring interpolation (i.e. $X_0$) (which original X value is provided in the original font data). Similarly, in general formula 2 specifies the interpolated value along the Y axis for a point requiring interpolation given the Y values of the bounding points before spatial manipulation by the variation vectors (i.e. $Y_{10}$ and $Y_{20}$) and given the Y values of the bounding points after spatial manipulation by the variation vectors (i.e. $Y_1$ and $Y_2$) and given the original Y value of the point requiring interpolation (i.e. $Y_0$).

FIG. 11D shows a detailed flowchart for the interpolation process according to the present invention. The method begins at entry point 1050 which is typically preceded by step 519 of FIG. 5. Next in step 1052, the bounding control points which have been specified by the variation vectors (from the variation data set) are determined for a particular point requiring interpolation. Since the control points along a contour are numbered in an order, processing typically proceeds from the lowest numbered control point to the highest numbered control point. When the system determines that a point requires interpolation, then the bounding points which do not require interpolation and which immediately surround the point requiring interpolation along the contour are determined. Thus, if points 2 and 5 along a contour are manipulated spatially to provide modified control point values according to variation vectors provided in the original variation data set and points 3 and 4 require interpolation because no variation vectors are provided for these points in the original variation data set then points 3 and 4 will use the coordinate values of points 2 and 5 for interpolation, and points 2 and 5 along the contour are referred to as the bounding points for points 3 and 4. Another example can be seen in FIG. 7A and in Table D where point 10 requires interpolation (since no variation vector is provided for this control point) and control points 9 and 11 constitute the bounding points for control point 10 as they are, along the contour, the closet points have variation vectors specified in the original data set. As shown in FIGS. 11B and 11C, control point 1012 requires interpolation and its bounding points are control points 1010 and 1011.

Following the determination of bounding points, the system determines in step 1053 whether the original X value of the point requiring interpolation is within the original X interpolation range of the original X values of the bounding points on the original contour. An example of this step may be considered by using FIG. 11B; the step checks whether the X value "$X_0$" of point 1012 (the original contour) is within the range of $X_{10}$ and $X_{20}$. As shown in FIG. 11B, $X_0$ is between $X_{10}$ and $X_{20}$ ($X_0$ is greater than X of smaller bounding point and less than X of larger bounding point $X_{20}$) and therefore is within the original X interpolation range of $X_{10}$ and $X_{20}$. Note that if point 1012 were, for whatever reason, to the left of point 1010 or to the right of point 1011, then $X_0$ would not be within the original X interpolation range. If the original X value is within the range then processing proceeds to step 1054; otherwise, processing proceeds to step 1070 in which the X value for the point requiring interpolation is set by finding the closest control point in X which does not require interpolation (using standard Euclidean distance measurements, for example) and determining the delta X used to spatially manipulate this closest control point (as specified by the scaled variation data set) and using this delta X to modify the original X value for the point requiring interpolation. In effect, X is set by X=old X+delta Xc, where delta Xc is the spatial manipulation change in X for the closest control point which does not require interpolation. Also in step 1070, a flag Xi is set to indicate that the X value for this point requiring interpolation will not be determined by linear interpolation pursuant to formula 1. Other means for indicating that linear interpolation will not be used will be appreciated by those skilled in the art. Following step 1070, processing proceeds to step 1054.

In step 1054, the system determines whether the original Y value of the point requiring interpolation is within the original Y range specified by the original Y values of the bounding points on the original contour. An example of this step may be considered by using FIG. 11C; the system checks whether the Y value "$Y_0$" of point 1012 (the original contour) is within the range of $Y_{10}$ and $Y_{20}$. As shown in FIG. 11C, $Y_0$ is between $Y_{10}$ and $Y_{20}$ ($Y_0$ is greater than smaller bounding point, and is less than the larger bounding point, $Y_{20}$) and therefore is within the original Y interpolation range. If the original Y value, $Y_0$, is within the range, then processing proceeds to step 1056; otherwise processing proceeds to step 1072 in which the Y value for the point requiring interpolation is set by finding the closest control point in Y which does not require interpolation (using standard Euclidean distance techniques) and determining the delta Y used to spatially manipulate this closest control point (as specified by the scaled variation data set) and using this delta Y to modify the original Y value for the point requiring interpolation. In effect, Y is set by Y=old Y+delta Yc, where delta Yc is the spatial manipulation change in Y for the closest control point in Y which does not require interpolation. Also in step 1072, a flag Yi is set to indicate that the Y value for this point requiring interpolation will not be determined pursuant to linear interpolation via formula 2. After step 1072, processing moves to step 1074, which determines whether new X and Y values for the point requiring interpolation have been determined by steps 1070 and 1072. If both new X and Y values have been determined then processing proceeds to step 1058 (skipping the linear interpolation steps of 1056 and 1057); otherwise (e.g. only Y has been determined) processing proceeds to step 1056.

In step 1056 of FIG. 11D, the interpolated X value for the point requiring interpolation is determined (if flag Xi is not set) on the basis of the old X value of that point and the old (before variation) and the new (after variation) X values for the bounding points. Formula 1 shown above may be used for this purpose. If the flag Xi is set (which indicates that the X value has been determined by using the delta X from the closest—in X—boundary point which has been specified, as described above in connection with step 1070) then linear interpolation pursuant to formula 1 is not used for providing the X value of the point requiring interpolation; thus, prior to determining the interpolated X value by using formula 1, the system checks, in step 1056, the status of flag Xi, and if the flag Xi is set processing proceeds to step 1057. In a similar fashion, in step 1057 the interpolated Y value for the point requiring interpolation is determined (if flag Yi is not set) on the basis of the old Y value of the point and the old (before variation) and the new (after variation) Y values for the bounding points. Formula 2 shown above may be used for this purpose. If the flag Yi is set (which indicates that the Y value in question has been determined by using the delta Y from the closest—in Y—boundary point which has been specified, as described above in connection with step 1072) then linear interpolation pursuant to formula 2 is not used for providing the Y value of the point requiring interpolation; thus, prior to determining the interpolated Y value by using formula 2, the system checks, in step 1057, the status of flag Yi, and if the flag Yi is set processing proceeds to step 1058. It will be appreciated that the interpolation process will attempt to preserve the relative locations of the control points by preserving the ratios of the distances between the intervening point and its bounding points. For example, if point 1012 of FIG. 11B is approximately halfway (along the X axis) between points 1010 and 1011, then the modified control point 1012A should be interpolated such that its X value places it approximately halfway between the X values of control points 1010A and 1011A. After determining the interpolated X and Y values in steps 1056 and 1057 or in step 1070 and 1072, processing proceeds to step 1058 in which the flags Xi and Yi are cleared (so they can be set again as appropriate for the next point interpolation). In the subsequent step 1059, the system determines whether another point on the current contour requires interpolation; typically, the system will merely move in numerical succession from control point to control point along a contour to determine if further points require interpolation. A flag or other indicator on the last point of the contour indicates that the system has processed all prior points of the contour. If another point requires interpolation, processing loops back to step 1052 and the process repeats itself in the manner described above. If all points requiring interpolation on the current contour have been interpolated, then step 1060 follows. In step 1060, the system determines whether any contour in the glyph remains to be interpolated. If all contours have been processed then the interpolation process is completed (step 1062); otherwise the process loops back to step 1052 to continue the interpolation for the next contour.

Since interpolation, such as linear interpolation as described here, is used to provide coordinate values for numerous control points along a glyph, it is advisable to provide the original variation vector data set such that the data set describes variation vectors for all "extreme points" on the outline. These extreme points are typically those points which have the smallest or the largest values in Y or have the smallest or largest values in X. This will often mean providing variation vectors for many of the control points around the extreme exterior edges of a glyph as well as providing variation vectors for some of the control points in the interior of a glyph. It will be appreciated that storing fewer variation vectors will take less storage space but require further processing in the form of interpolation in order to determine the interpolated coordinate values for those control points not specified in the variation vector data set.

FIG. 9 illustrates a particular aspect of the present invention wherein several variation data sets from several different variation axes are applied to the default outline data in order to obtain a variant font which has been varied along 2 or more variation axes. As shown in FIG. 9, the default outline font data 903 represented by the control points of the "H" glyph are varied (represented by the addition function 908) by a bold variation 905 (such as the data set shown in Tables C or Table D), and the default outline font data 903 is again varied (shown by the addition function 910) by an italicized variation 907 and then the two variations are merged (operator 915) to yield spatially manipulated control points representing the outline of a modified/varied glyph 911 which has been varied according to 2 variation axes independently. The merger combines the changes from the variations with the original/default outline data. A particular method for implementing this multiple axis variation is shown in FIG. 10 wherein the invention checks at step 951, after completing step 521 whether the user has selected another variation for the font. If the user has not selected another variation for the font, processing proceeds to step 523 in which the varied font data is scaled according to conventional techniques. If the user has selected another variation for the font as determined in step 951, then the system determines in step 954 whether all variation axes have been fully processed. If processing is completed independently for all variation axes, then the spatial manipulation change from each variation axis is merged (addition of delta values) and the merged spatial manipulation change is applied to the default outline data (e.g. Table A) to provide coordinate values for the multiple-varied font. This merger occurs in step 962 after step 954 determines all variation axes have been processed. As noted above, each variation axis is processed independently and fully before merger such that the default outline data (e.g. Table A) is spatially manipulated with the variation vectors for that variation axis and all points requiring interpolation are interpolated to provide a complete set of control points with spatially manipulated control points for each variation axis. After all variation axes have been processed, the multiple delta X values for each control point from the multiple variations are added to provide merged delta X values for each control point. A similar operation is performed for the Y values. Thus, for example, where 2 variations are processed (e.g. bold and italics), there will be, for each control point, a delta Xb and delta Xi and a delta Yb and delta Yi, where delta Xb is the spatial manipulation change in X to the control point due to the bold variation, delta Xi is the spatial manipulation change in X to the control point due to the italics variation, delta Yb is the spatial manipulation change in Y due to the bold variation, etc. In this case of 2 variations, for a particular control point, the merged X and Y values will be: X=Xold+delta Xb+delta Xi and Y=Yold+delta Yb+delta Y where Xold is the original outline font data value in X for the particular control point (e.g. an X value from Table A) and Yold is the original outline font data value in Y for the particular control point. It will be appreciated that the spatial manipulation change represents only the change due to the variation (e.g. the scaled variation vectors such as those shown in Table F or the change values provided by the interpolation process). Of course, the change value may be obtained from a spatially manipulated control point merely by subtracting the original value of the point from the value after spatial manipulation. After the merger operation of step 962, processing proceeds to step 523 which has been described above.

At step 954, if all variation axes have not been processed, then processing goes to step 956 where the system saves the control points from the prior variation axis processing. It will be appreciated that all control points after each variation axis processing should be saved in order to perform the merger operation of step 954; either the actual control point values (i.e. Xold+deltaX and Yold+delta Y) or the change values (i.e. delta X and delta Y) may be saved. Then in step 958, the original/default control point data is retrieved or otherwise made available for another variation axis processing (through steps 515 through 521), and at step 960 processing proceeds back to step 515 to process another variation axis.

In the manner described here, a default outline font data resource in conjunction with a plurality of variation data sets may provide a robust variety of styles of fonts while at the same time minimizing data storage and also freeing an application programmer from having to utilize graphics techniques such as smearing in order to obtain varied fonts. It will be appreciated that the method and apparatus of the invention can be used in a variety of applications to enhance digital typeface or font data. It will also be appreciated that many alternative techniques may be utilized in providing and modifying the variation data set, in the type of data which is maintained in the variation data set and in the manner in which the data set is scaled in order to obtain different values within a particular variation process. It will also be appreciated that numerous other modifications to the present invention may be made without departing from the spirit and scope of the invention as defined by the following claims.

I claim:

1. A method for displaying a symbol image in a computer controlled display system, said method comprising:

providing a first plurality of control points specifying outlines of the symbol image, said first plurality of control points having a first style;

providing variation data for specifying a set of variations for at least one of said control points, said variation data including an identification of said at least one of said control points and specification of a spatial manipulation of said at least one of said control points;

modifying said first plurality of control points which specify the outlines of said symbol image, wherein said modifying step occurs by using said variation data to manipulate spatially said at least one of said control points to provide a second plurality of control points, said second plurality of control points having a second style, said second style different than said first style;

modifying said second plurality of control points according to hints and font instructions to form a modified second plurality of control points, said modified second plurality of control points having said second style;

converting said modified second plurality of control points to provide a displayable representation of said symbol image; and displaying said displayable representation.

2. A method as in claim 1 further comprising selecting a value in a variant range wherein said value in said variant range modifies said spatial manipulation according to said value.

3. A method as in claim 2 wherein said specification of a spatial manipulation comprises a representation of a direction and a magnitude.

4. A method as in claim 2 wherein said first plurality of control points is stored in a memory means and wherein said second plurality of control points is stored in said memory means.

5. A method as in claim 2 wherein said converting step scan converts an outline of said symbol image represented by said second plurality of control points to provide said displayable representation of said symbol image.

6. A method as in claim 2 further comprising scaling said second plurality of control points to provide a scaled set of said second plurality of control points and wherein said converting comprises scan converting said scaled set of said second plurality of control points to provide said displayable representation of said symbol image.

7. A method as in claim 5 wherein said displayable representation comprises a bit map of said symbol image.

8. A method as in claim 6 wherein said displayable representation comprises a bit map of said symbol image.

9. A method as in claim 2 wherein said variation data comprises first variation data and second variation data and wherein said first variation data represents a first value in said variant range and said second variation data represents a second value in said variant range.

10. A method as in claim 9 wherein said first value in said variant range represents a minimum of said variant range and said second value in said variant range represents a maximum of said variant range.

11. A method as in claim 2 wherein said variation data comprises a first variation data and wherein said step of selecting a value in a variant range comprises selecting a first value in a first variant range and wherein said method further comprises providing a second variation data for specifying a second set of variations for at least one of said control points, said second variation data including an a second identification of said at least one of said control points and a second specification of a second spatial manipulation of said at least one of said control points, and wherein said method further comprises selecting a second value in a second variant range and further comprises modifying said first plurality of control points which specify the outlines of said symbol image, wherein said modifying step occurs by using said first variation data to manipulate spatially said at least one of said control points and by using said second variation data to manipulate spatially said at least one of said control points to provide a second plurality of control points.

12. A method for displaying a glyph of a font on a display device of a computer controlled display system, said method comprising:

storing a first plurality of control points specifying outlines of said glyph, said first plurality of control points representing a default image of said glyph, said first plurality of control points having a first style;

selecting a value in a variant range;

storing first variation data for specifying a set of variations of at least one of said control points, said first variation data including an identification of said at least one of said control points and specification of a spatial manipulation of said at least one of said control points;

determining modified first variation data, such that said first variation data is modified according to said value in said variant range;

modifying said first plurality of control points which specify the outlines of said glyph, wherein said modifying occurs by using said modified first variation data to manipulate spatially said at least one of said control points to provide a second plurality of control points, said second plurality of control points having a second style, said second style different than said first style;

scaling said second plurality of control points according to a selected size for said glyph to provide a third plurality of control points;

modifying said third plurality of control points according to hints and font instructions to form a modified third plurality of control points, said modified third plurality of control points having said second style;

scan converting said modified third plurality of control points to provide a displayable bit map representation of said glyph;

storing said displayable bit map representation of said glyph; and displaying said displayable bit map representation of said glyph.

13. A method as in claim 12 wherein said first plurality of control points and said first variation data and said second plurality of control points are specified in a master coordinate space.

14. A method as in claim 12 wherein said step of selecting a value in a variant range comprises selecting a first value in a first variant range and wherein said method further comprises storing second variation data for specifying a second set of variations of at least one of said control points, said second variation data including an identification of said at least one of said control points and specification of a spatial manipulation of said at least one of said control points, and wherein said method further comprises modifying said first plurality of control points which specify the outlines of said glyph, wherein said modifying step occurs by using said first variation data to manipulate spatially said at least one of said control points and by using said second variation data to manipulate spatially said at least one of said control points to provide said second plurality of control points.

15. A computer controlled display system for display of a glyph, said system comprising:

means for storing a first plurality of control points specifying outlines of said glyph, said first plurality of control point having a first style;

means for storing variation data for specifying a set of variations of at least one of said control points, said variation data including a means for identifying said at least one of said control points and including a means for specifying a spatial manipulation of said at least one of said control points;

means for modifying said first plurality of control points, said means for modifying being coupled to said means for storing first plurality of control points and being coupled to said means for storing said variation data, said means for modifying using said variation data to manipulate spatially said at least one of said control points to provide a second plurality of control points, said second plurality of control points having a second style, said second style different than said first style;

means for modifying said second plurality of control points according to hints and font instructions to form a modified second plurality of control points, said means for modifying said second plurality of control points coupled to receive said second plurality of control points, said modified second plurality of control points having said second style;

means for scan converting said modified second plurality of control points to provide a displayable representation of said glyph, said means for scan converting being coupled to receive said modified second plurality of control points;

means for storing said displayable representation of said glyph being coupled to said means for scan converting; and means for displaying said displayable representation of said glyph, said means for displaying being coupled to said means for storing said displayable representation of said glyph.

16. A computer controlled display system as in claim 15 further comprising means for selecting a value in a variant range wherein said value in said variant range modifies said spatial manipulation according to said value.

17. A computer controlled display system as in claim 16 wherein said means for modifying and said means for scan converting comprises a processor and wherein said means for storing said displayable representation comprises a frame buffer.

18. A computer controlled display system as in claim 16 wherein said means for modifying said first plurality of control points includes means for multiplying said value in said range times said variation data and further includes means for adding the resulting product to the coordinates of said at least one of said control points to provide said second plurality of control points.

19. A computer controlled display system as in claim 16 wherein said variation data comprises first variation data and second variation data and wherein said first variation data corresponds to a first value in said variant range and said second variation data corresponds to a second value in said variant range.

20. A computer controlled display system as in claim 19 wherein said first value in said variant range represents a minimum of said variant range and said second value in said variant range represents a maximum of said variant range.

21. A method for displaying a symbol image in a computer controlled display system, the method comprising:

providing a first plurality of control points specifying outlines of the symbol image, the first plurality of control points having a first style;

selecting a variation for the symbol image, wherein the variation corresponds to a second style different than the first style;

providing a variation weight table including a default weight corresponding to the first style of the symbol image, and a range of changes from the default weight corresponding to at least one other style;

providing a variation data set having an identification of at least one of the control points and specification of a spatial manipulation of the at least one of the control points;

determining a weight value within the range of changes from the default weight;

scaling the variation data set according to the weight value;

modifying the first plurality of control points in response to the scaled variation data set to produce a second plurality of control points having the second style;

modifying the second plurality of control points according to hints and font instructions to form a modified second plurality of control points, the modified second plurality of control points having the second style;

converting the modified second plurality of control points to provide a displayable representation of the symbol image; and displaying the displayable representation.

\* \* \* \* \*